US009347444B2

(12) United States Patent
Nettesheim et al.

(10) Patent No.: US 9,347,444 B2

(45) Date of Patent: May 24, 2016

(54) DIAPHRAGM PUMP AND METHOD FOR DELIVERING FINE-GRAIN POWDER WITH THE AID OF A DIAPHRAGM PUMP

(71) Applicant: Reinhausen Plasma GmbH, Regensburg (DE)

(72) Inventors: Stefan Nettesheim, Berlin (DE); Andreas Albrecht, Regensburg (DE); Johann Menath, Lappersdorf (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 0 days.

(21) Appl. No.: 14/053,955

(22) Filed: Oct. 15, 2013

(65) Prior Publication Data

US 2014/0037466 A1 Feb. 6, 2014

Related U.S. Application Data

(63) Continuation of application No. PCT/EP2012/055613, filed on Mar. 29, 2012.

(30) Foreign Application Priority Data

Apr. 15, 2011 (DE) ........................ 10 2011 017 277
May 3, 2011 (DE) ........................ 10 2011 100 378
Aug. 5, 2011 (DE) ........................ 10 2011 052 432

(51) Int. Cl.
*B65G 53/66* (2006.01)
*F04B 43/02* (2006.01)
*B05B 7/14* (2006.01)
(Continued)

(52) U.S. Cl.
CPC ................ *F04B 43/02* (2013.01); *B05B 7/144* (2013.01); *B05B 7/1459* (2013.01); *F04B 15/02* (2013.01); *F04B 43/0054* (2013.01); *F04B 43/0081* (2013.01)

(58) Field of Classification Search
USPC .......... 406/50, 85, 96, 109, 197; 417/53, 472; 222/334
See application file for complete search history.

(56) References Cited

U.S. PATENT DOCUMENTS 2,946,488 A * 7/1960 Kraft ............................ 222/134
3,260,285 A * 7/1966 Vogt ................................ 141/8
(Continued)

FOREIGN PATENT DOCUMENTS

DE 4423197 A1 1/1996
DE 10353968 A1 7/2005
(Continued)

OTHER PUBLICATIONS

JP Office Action dated Dec. 16, 2014.

*Primary Examiner* — Joseph Dillon, Jr.

(74) *Attorney, Agent, or Firm* — Simpson & Simpson, PLLC

(57) ABSTRACT

The invention relates to a diaphragm pump having a delivery space, which encloses a working volume, at least one deflectable diaphragm, which can be moved into a suction position and a pump position, an inlet valve arranged on a suction side of the diaphragm pump and an outlet valve arranged on the pressure side of the diaphragm pump. In order to make it possible to deliver fine-grain powder, for example, non-flowable powders having particle sizes of 0.01 μm to 100 μm, using a diaphragm pump, it is proposed that a gas feed for introducing a gas into the delivery space be arranged at the delivery space. In addition, the invention relates to a method for delivering fine-grain powder.

13 Claims, 1 Drawing Sheet

(51) Int. Cl.
*F04B 15/02* (2006.01)
*F04B 43/00* (2006.01)

(56) References Cited

U.S. PATENT DOCUMENTS

| | | | | |
|---|---|---|---|---|
| 3,637,330 | A * | 1/1972 | Goeldner | 417/389 |
| 3,788,368 | A * | 1/1974 | Geng et al. | 141/67 |
| 3,932,065 | A * | 1/1976 | Ginsberg et al. | 417/317 |
| 3,951,572 | A * | 4/1976 | Ray et al. | 417/389 |
| 3,994,627 | A * | 11/1976 | Calzolari | 417/317 |
| 4,052,849 | A * | 10/1977 | Dumbaugh | 60/325 |
| 4,407,436 | A * | 10/1983 | Broadfoot et al. | 222/636 |
| 4,517,099 | A * | 5/1985 | Breckner | 210/741 |
| 4,521,165 | A * | 6/1985 | Handleman | 417/393 |
| 4,893,966 | A * | 1/1990 | Roehl | 406/127 |
| 5,622,484 | A * | 4/1997 | Taylor-McCune et al. | 417/393 |
| 5,741,558 | A * | 4/1998 | Otani et al. | 427/469 |
| 6,283,680 | B1 * | 9/2001 | Vidal | 406/128 |
| 6,447,216 | B1 * | 9/2002 | Higuchi et al. | 406/27 |
| 6,478,513 | B1 | 11/2002 | Higuchi et al. | |
| 6,508,610 | B2 * | 1/2003 | Dietrich | 406/13 |
| 6,623,215 | B2 * | 9/2003 | Dietrich | 406/197 |
| 6,712,587 | B2 * | 3/2004 | Gerhardt et al. | 417/390 |
| 6,929,454 | B2 * | 8/2005 | Munzenmaier et al. | 417/403 |
| 6,953,315 | B2 * | 10/2005 | Cartwright | 414/217 |
| 7,144,213 | B2 * | 12/2006 | Cartwright | 414/217 |
| 7,150,585 | B2 * | 12/2006 | Kleineidam et al. | 406/50 |
| 7,157,274 | B2 * | 1/2007 | Bohm et al. | 435/325 |
| 7,163,359 | B2 * | 1/2007 | Moser | 406/74 |
| 7,241,080 | B2 * | 7/2007 | Klobucar et al. | 406/50 |
| 7,287,964 | B2 * | 10/2007 | Sanwald | 417/397 |
| 7,311,502 | B2 * | 12/2007 | Gerhardt et al. | 417/390 |
| 7,410,329 | B2 * | 8/2008 | Simontacchi | 406/98 |
| 7,452,166 | B2 * | 11/2008 | von Keudell et al. | 406/98 |
| 7,465,130 | B2 * | 12/2008 | Herre et al. | 406/50 |
| 7,478,976 | B2 * | 1/2009 | Kleineidam et al. | 406/50 |
| 7,481,605 | B2 * | 1/2009 | Kleineidam et al. | 406/50 |
| 7,530,768 | B2 * | 5/2009 | Durr et al. | 406/151 |
| 8,057,129 | B2 * | 11/2011 | Kleineidam et al. | 406/50 |
| 8,201,579 | B2 * | 6/2012 | Schmid et al. | 137/613 |
| 8,215,877 | B2 * | 7/2012 | Rieger et al. | 406/96 |
| 8,231,310 | B2 * | 7/2012 | Sanwald | 406/34 |
| 8,256,996 | B2 * | 9/2012 | Kleineidam et al. | 406/50 |
| 8,430,640 | B2 * | 4/2013 | Mauchle et al. | 417/12 |
| 8,459,203 | B2 * | 6/2013 | Mauchle et al. | 118/704 |
| 8,491,226 | B2 * | 7/2013 | Kleineidam et al. | 406/50 |
| 8,678,777 | B2 * | 3/2014 | Fulkerson et al. | 417/86 |
| 8,790,048 | B2 * | 7/2014 | Furuyama et al. | 406/127 |
| 2001/0003568 | A1 * | 6/2001 | Dietrich | 406/131 |
| 2005/0019106 | A1 * | 1/2005 | Moser | 406/73 |
| 2006/0093442 | A1 * | 5/2006 | Kleineidam et al. | 406/10 |
| 2006/0193704 | A1 * | 8/2006 | Simontacchi | 406/88 |
| 2007/0081865 | A1 * | 4/2007 | Kleineidam et al. | 406/50 |
| 2009/0304532 | A1 * | 12/2009 | Tabanelli et al. | 417/312 |
| 2010/0034600 | A1 * | 2/2010 | Sanwald | 406/28 |
| 2010/0245498 | A1 * | 9/2010 | Koizumi et al. | 347/85 |

FOREIGN PATENT DOCUMENTS

| | | | |
|---|---|---|---|
| DE | 102005006522 | B3 | 8/2006 |
| EP | 1437178 | A2 | 7/2004 |
| JP | 60-2526 | | 1/1985 |
| KR | 10-2004-0063817 | | 11/2006 |

* cited by examiner

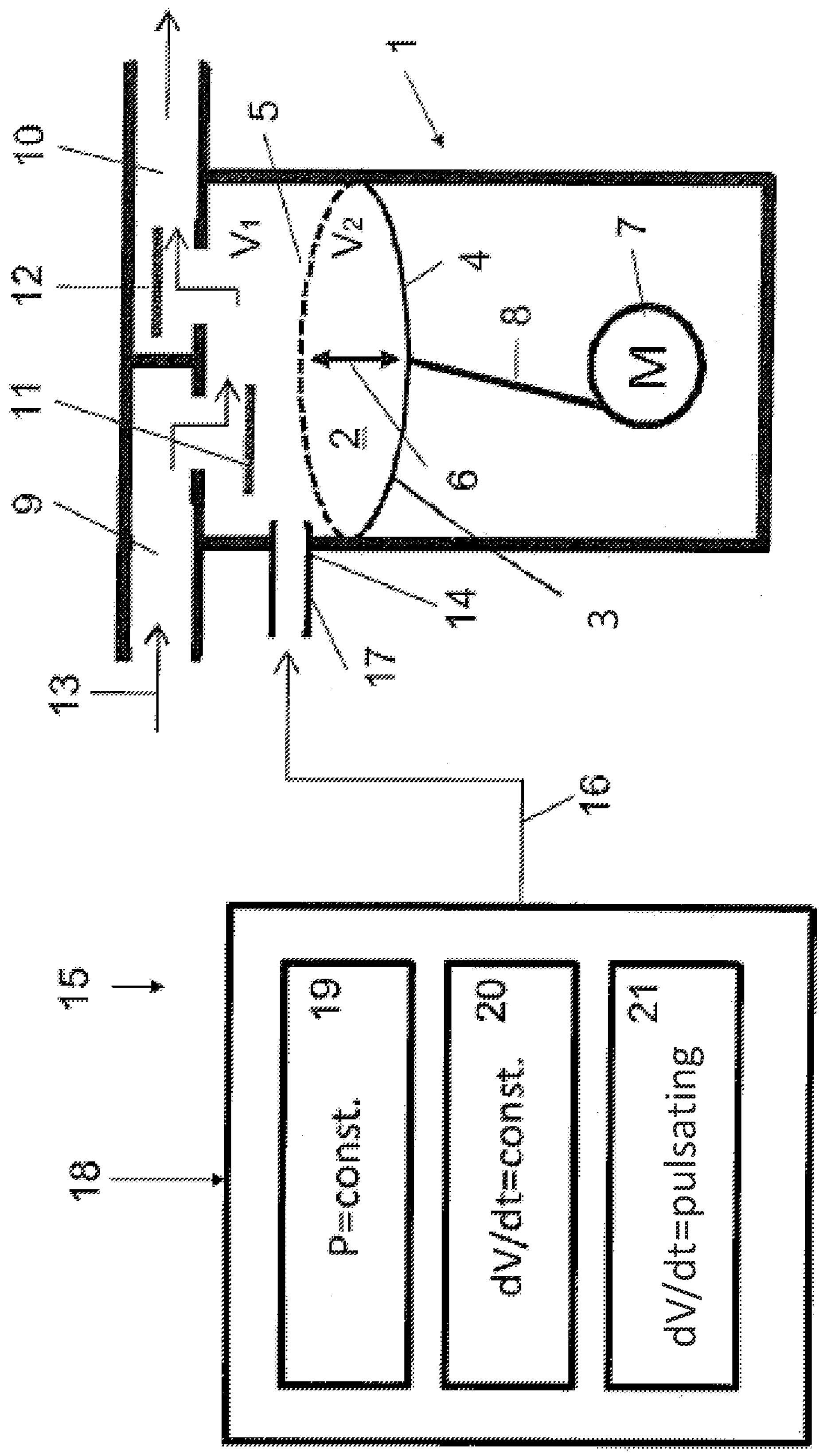
1
2
3
4
5
6
7
8
9
10
11
12
13
14
15
16
17
18
19
20
21
$V_1$
$V_2$
M
P=const.
dV/dt=const.
dV/dt=pulsating

DIAPHRAGM PUMP AND METHOD FOR DELIVERING FINE-GRAIN POWDER WITH THE AID OF A DIAPHRAGM PUMP

CROSS-REFERENCE TO RELATED APPLICATIONS

This application is filed under 35 U.S.C. §120 and §365(c) as a continuation of International Patent Application PCT/EP2012/055613, filed Mar. 29, 2012, which application claims priority from German Patent Application No. 10 2011 017 277.7, filed Apr. 15, 2011, German Patent Application No. 10 2011 100 378.2, filed May 3, 2011 and German Patent Application No, 10 2011 052 432.0, filed Aug. 5, 2011, which applications are incorporated herein by reference in their entireties.

FIELD OF THE INVENTION

The invention relates to a method for conveying fine-grained powders by means of a diaphragm pump. The diaphragm pump includes a conveyance chamber, which encloses a working volume and at least one deflectable diaphragm, which can be brought into a suction position and a pressure position. The diaphragm pump further includes an inlet valve arranged at its suction side and an outlet valve arranged at its pressure side.

BACKGROUND OF THE INVENTION

Methods for conveying fine-grained powders are required, for example, for conveying dosed quantities of fine-grained powders for plasma coating processes. Deposits and agglomerations of the powder in the conveying paths and the pump must he avoided, since otherwise the powder conveyance can come to a standstill.

The conveyance of fine powders with a particle size of less than 150 μm is scarcely possible with known pumps. Below this grain size, the adhesion forces between the powder particles increase considerably. The surface area of the particles relative to their volume increases steeply. A cube with an edge length of 1 cm has a surface of 0.006 $m^2$. However, the same volume filled with particles of five nanometers edge length has a surface area of 2400 $m^2$. The steep increase in the surface adhesion forces impairs the conveyance of such small particles. By continuously coupling energy into the powder, for example, by sustaining high flow speeds, which is associated to a high gas or air consumption, agglomeration of the powder/gas mixture can be avoided. High gas volume flows are, however, disadvantageous in many subsequent working processes, such as, for example, in plasma-coating processes or laser-coating processes. Furthermore, high gas volume streams require higher energy application for the powder conveyance.

German Patent Application No. 44 23 197 A1 discloses a powder pump for the spray-coating of articles in a bar-type elongated shape. On a front side, the powder pump has a powder inlet opening, via which the powder is aspirated from an upwardly open powder container. The powder is subsequently conveyed via an inner tube of the powder pump to a consumer. The conveyance itself is driven by generating a vacuum within the powder pump. The vacuum is generated with an injector nozzle arranged in the vicinity of the powder inlet opening.

Furthermore, diaphragm pumps for the conveyance of gases and fluids are known from prior art. The working space is separated by a deflectable membrane from the pump drive. By virtue of this separation, the pump drive is shielded from harmful effects incurred from the conveyed medium. During a suction cycle, the oscillating deflection of the membrane increases the working volume of the conveyance chamber while fully deflected in the suction position, and likewise reduces the working volume of the conveyance chamber white the fully deflected in the pressure position. The deflection of the membrane is driven hydraulically, pneumatically, or mechanically. On the suction side of the diaphragm pump, an inlet valve is arranged that is actuated by the medium conveyed. On the pressure side, an outlet valve is arranged that is likewise actuated by the medium conveyed. During the intake stroke of the membrane, the conveyed medium is aspirated via the inlet valve. During the compression stroke of the membrane, the conveyed medium is exhaled via the outlet valve.

When using a diaphragm pump for the conveyance of a powder/gas mixture, for example, containing fine-grained powders, the flow speed in the working volume of the conveyance chamber of the diaphragm pump is typically insufficient to exhale the entire amount of powder through the outlet valve.

Consequently, increasing accumulations of powder form inside the conveyance chamber of the diaphragm pump as the operation of the diaphragm pump goes on, thus, reducing the suction power and eventually blocking the diaphragm pump. For example, for very fine-grained powders, powder agglomerates can form that Obstruct the powder conveyance or block the diaphragm pump. A blockage of the diaphragm pump cannot be avoided by increasing the pumping power. Instead, it is necessary to open the conveyance chamber and to remove the obstruction.

Another influence factor on the formation of deposits is the geometric shape of the conveyance chamber. Powder deposits form, for example, in regions with a lower flow velocity of the powder/gas mixture. It has also been found that blockages occur in the region of the outlet valves during the conveyance of fine-grained powders. Mitigation of these ‘problem zones’ in the conveyance chamber by increasing the flow rate of a diaphragm pump with a given working range, from a particular negative pressure on the suction side and a particular pressure at the pressure side, is not readily possible.

BRIEF SUMMARY OF ME INVENTION

It is the object of the invention to provide a diaphragm pump suitable for the conveyance of fine-grained powders, for example, non-flowable powders having particle sizes of 0.01 μm to 100 μm.

This object is achieved with a diaphragm pump which includes a conveyance chamber which encloses a working volume; at least one deflectable diaphragm, which can be moved into a suction position and a pressure position; an inlet valve for a powder/gas mixture arranged at a suction side of the diaphragm pump; an outlet valve for a powder/gas mixture arranged at a pressure side of the diaphragm pump; and a gas supply for introducing a gas into the conveyance chamber is arranged at the conveyance chamber via an inlet, where the inlet is oriented such that gas impinges on regions of the conveyance chamber in which deposits of the conveyed powder can be formed.

It is also an object of the invention to provide a method for the conveyance of fine-grained powders, for example, non-flowable powders having particle sizes of 0.01 μm to 100 μm. The above object is achieved by a method for conveying a powder/gas mixture by means of a diaphragm pump, having the following steps: providing a conveyance chamber for enclosing a working volume; limiting the conveyance chamber on one side with a deflectable diaphragm; moving the deflectable diaphragm between a suction position and a pump position, where an inlet valve is arranged on the suction side of the diaphragm pump and an outlet valve is arranged on a pressure side of the diaphragm pump; and introducing a gas into the conveyance chamber via a gas supply such that gas impinges regions of the conveyance chamber in which deposits of the conveyed powder can form.

The inlet valve of the diaphragm pump acts as a non-return valve, such that the supplied gas, for example air, can stream out of the outlet valve only in the conveyance direction of the diaphragm pump. The additional introduction of gas continuously ensures optimal flow conditions in the working volume of the diaphragm pump and avoids powder deposits in the conveyance chamber.

The maximum load of the additionally introduced gas is limited by the suction power of the diaphragm pump during the suction stroke. If the maximum load is exceeded, the diaphragm pump can no longer aspirate powder or powder/gas mixture via the pressure-controlled inlet valve and the inlet valve remains closed.

The effect of introducing the gas into the conveyance chamber is that the inlet valve shuts earlier, and that the powder or powder/gas mixture in the working space, together with the gas additionally introduced into the conveyance chamber, is exhausted entirely through the outlet valve.

A low-pulsation powder supply for continuous subsequent processes can be provided when the supply of gas to a compressor for generating a constant volume flow of the gas.

An effective cleaning of the conveyance chamber by means of the supplied gas is achieved, when the gas supply has a compressor for generating a pulsating volume flow of the gas.

For subsequent pressure-controlled processes, the gas supply includes, for example, a compressor for generating a constant pressure of the supplied gas.

The gas is introduced, for example, at a wall of the conveyance chamber via a gas inlet. The inlet can be designed as passage in the wall or as a nozzle.

For example, an inlet embodied by a nozzle may be expediently aligned such that gas impinges on regions of the conveyance chamber which are, due to the flow conditions, prone to the formation of deposits of the conveyed powder.

The diaphragm pump according to the invention is suitable for the conveyance of extremely fine-grained powders. It may also be advantageously employed for conveying condensate-containing gases.

The gas is introduced with a constant volume flow into the conveyance chamber, where the gas is introduced with a volume flow in a range of 1 L/min to 50 L/min.

BRIEF DESCRIPTION OF IRE DRAWINGS

The nature and mode of operation of the present invention will now be more fully described in the following detailed description of the invention taken with the accompanying drawing figures, in which:

FIG. 1 is a schematic representation of an inventive diaphragm pump and illustrates the inventive method.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Diaphragm pump 1 has conveyance chamber 2 enclosing working volume $V_1$ and $V_2$ respectively and being on one side limited by deflectable membrane 3. Membrane 3 can be moved between suction position 4 and pressure position 5. In FIG. 1, membrane 3 is in suction position 4 as indicated by a solid line. Oscillating deflection movement 6 is driven by means of an eccentric drive comprising an electric motor and drive rod 8.

On a suction side of diaphragm pump 1, inlet valve 11 is arranged and, at a pressure side of the diaphragm pump, outlet valve 12 is arranged. Both inlet valve 11 and outlet valve 12 are controlled and actuated by the pressure of powder/gas mixture 13 conveyed by diaphragm pump 1. Inlet valve 11 opens during the intake stroke of membrane 3 towards suction position 4 and shuts in pressure position 5 of membrane 3 after the pressure stroke. Conversely, outlet valve 12 shuts during the intake stroke of membrane 3 and opens during the pressure stroke.

Gas supply 15 for introducing gas 16, for example air, into conveyance chamber 2 is arranged at one wall 14 of conveyance chamber 2. Gas supply 15 includes an injector embodied by nozzle 17 passing through wall 14. By means of this injector, gas 16 is introduced into conveying chamber 2 in a targeted manner as to dissolve powder accumulations and to inject an additional amount of gas 16 to powder/gas mixture 13. Gas supply 15 further includes is schematically displayed compressor 18, which is connected via a line to nozzle 17. Depending on the composition of powder/gas mixture 13 to be conveyed and/or depending on the subsequent, downstream process, compressor 18 generates constant pressure 19 of gas 16, a constant volume flow of gas 16 or pulsating volume flow 21 of gas 16, which is then introduced via nozzle 17 in conveyance chamber 2.

For conveying small quantities of the fine granular powder, gas 16 is introduced into conveyance chamber 2 with a volume flow rate ranging from 1 L/min to 50 L/min. The oscillation frequency of membrane 3 for conveying fine powders ranges, for example, from 10 Hz to 200 Hz at a maximum working volume in the range of 0.1 mL to 20 mL.

Driving diaphragm pump 1 at high frequencies promotes the continuous conveyance of small amounts of the fine-grained powder. It is advantageous for the continuous, low-pulsation discharge of fine-grained powders that each diaphragm pump 1 is connected on its suction side 9 via an as short as possible suction line to a suction means for aspirating powder from a powder reservoir. Suitable lengths of the suction line were found to range from 0.01 m to 1 m, for example, from 0.01 m to 0.5 m, while the length of the pressure line to the low-pulsation conveying is, for example, longer by at least a factor of 10. In tests with suction and pressure lines with an inner diameter of 2.5 mm, there was no low-pulsation conveyance with pressure line lengths of 3 m. However, pressure line lengths of more than 10 m yielded low-pulsation conveyance. From these tests, it has been recognized that a uniform, low-pulsation discharge of the fine powder is achieved if the diaphragm pump is connected on pressure side 10 to a pressure line and if the length of the pressure line exceeds its diameter at least by a factor of 2000.

By introducing gas 16 into conveyance chamber 2 and the arrangement of nozzle 17 it is achieved and ensured that flow conditions remain always optimal in working volume $V_1$ and $V_2$ respectively of conveyance chamber 2 and that powder deposits, causing clogging in conveying chamber 2 and ultimately the failure of diaphragm pump 1, are reliably avoided.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

List of reference numbers

| No. | Description |
|---|---|
| 1 | diaphragm pump |
| 2 | conveyance chamber |
| 3 | membrane |
| 4 | suction position |
| 5 | pressure position |
| 6 | deflection movement |
| 7 | electric motor |
| 8 | drive rod |
| 9 | suction side |
| 10 | pressure side |
| 11 | inlet valve |
| 12 | outlet valve |
| 13 | powder/gas mixture |
| 14 | wall |
| 15 | gas supply |
| 16 | gases |
| 17 | nozzle |
| 18 | compressor |
| 19 | constant pressure |
| 20 | constant volume flow |
| 21 | pulsating volume flow |

What is claimed is:

1. A diaphragm pump which conveys a powder/gas mixture, comprising:

a conveyance chamber which encloses a working volume;

at least one deflectable diaphragm, which can be moved into a suction position and a pressure position;

an inlet valve for the powder/gas mixture arranged at a suction side of the diaphragm pump and arranged to displace in a first direction to enable flow of the powder/gas mixture into the conveyance chamber in the first direction;

an outlet valve for the powder/gas mixture arranged at a pressure side of the diaphragm pump and arranged to displace in a second direction to enable flow of the powder/gas mixture out of the conveyance chamber in the second direction; and, a gas supply, including a compressor for introducing a gas into the conveyance chamber, is arranged at the conveyance chamber via an inlet, wherein:

the inlet is oriented such that the gas impinges on regions of the conveyance chamber in which deposits of conveyed powder can be formed; and, the compressor is for generating a pulsating volume flow of the gas.

2. The diaphragm pump as recited in claim 1, wherein the suction side is connected with a powder supply or an inlet of the powder/gas mixture.

3. The diaphragm pump as recited in claim 1, wherein the gas supply is arranged at a wall of the conveyance chamber.

4. The diaphragm pump as recited in claim 3, wherein the inlet is a nozzle or a passage in the wall of the conveyance chamber.

5. The diaphragm pump as recited in claim 1, wherein the diaphragm is two-dimensional.

6. A method for conveying a powder/gas mixture by means of a diaphragm pump; comprising the steps of:

providing a conveyance chamber for enclosing a working volume;

limiting the conveyance chamber on one side with a deflectable diaphragm;

arranging an inlet valve at a suction side of the diaphragm pump;

displacing the inlet valve in a first direction to enable flow, in the first direction, of the powder/gas mixture into the conveyance chamber;

arranging an outlet valve at a pressure side of the diaphragm pump;

displacing the outlet valve in a second direction to enable flow, in the second direction, of the powder/gas mixture out of the conveyance chamber;

moving the deflectable diaphragm between a suction position and a pump position; and, introducing, with a pulsating volume flow, a gas into the conveyance chamber, via a compressor for a gas supply, such that the gas impinges regions of the conveyance chamber in which deposits of conveyed powder can form.

7. The method as recited in claim 6, wherein a powder or the powder/gas mixture is aspirated at the suction side of the diaphragm pump.

8. The method as recited in claim 6, wherein the gas is introduced with a volume flow in a range of 1 L/min to 50 L/min.

9. The diaphragm pump as recited in claim 1, wherein the compressor is for generating a cyclic variable output of the gas.

10. The method as recited in claim 6, further comprising:

generating, using the compressor, a cyclic variable output of the gas.

11. A diaphragm pump which conveys a powder/gas mixture, comprising:

a conveyance chamber which encloses a working volume;

at least one deflectable diaphragm, which can be moved in first and second opposite directions into a suction position and a pressure position, respectively;

an inlet valve for the powder/gas mixture arranged at a suction side of the diaphragm pump and arranged to displace in the first direction to enable flow of the powder/gas mixture into the conveyance chamber;

an outlet valve for the powder/gas mixture arranged at a pressure side of the diaphragm pump and arranged to displace in the second direction to enable flow of the powder/gas mixture out of the conveyance chamber; and, a gas supply, including a compressor for introducing a gas into the conveyance chamber, arranged at the conveyance chamber via an inlet, wherein:

the inlet is oriented such that the gas impinges on regions of the conveyance chamber in which deposits of conveyed powder can be formed; and, the compressor is for generating a pulsating volume flow of the gas.

12. The diaphragm pump as recited in claim 11, wherein:

the inlet valve is arranged to displace in the first direction to enable flow of the powder/gas mixture into the conveyance chamber in the first direction; and, the outlet valve is arranged to displace in the second direction to enable flow of the powder/gas mixture out of the conveyance chamber in the second direction.

13. The diaphragm pump as recited in claim 11, wherein the compressor is for generating a cyclic variable output of the gas.

* * * * *